(12) United States Patent
Dagenais

(10) Patent No.: US 8,777,201 B2
(45) Date of Patent: Jul. 15, 2014

(54) CLAMP COMPRISING A MULTI-PART GUIDE PATH

(75) Inventor: Jean-François Dagenais, Cassis (FR)

(73) Assignee: Serimax, Mitry Mory (FR)

( * ) Notice: Subject to any disclaimer, the term of this patent is extended or adjusted under 35 U.S.C. 154(b) by 581 days.

(21) Appl. No.: 13/073,426

(22) Filed: Mar. 28, 2011

(65) Prior Publication Data

US 2012/0074632 A1    Mar. 29, 2012

(30) Foreign Application Priority Data

Sep. 24, 2010 (FR) ...................................... 10 03798

(51) Int. Cl.
*B25B 1/20* (2006.01)
(52) U.S. Cl.
USPC .......................................................... 269/37
(58) Field of Classification Search
USPC ......... 29/235, 238, 239, 281.1; 81/53.3, 53.1; 269/37
See application file for complete search history.

(56) References Cited

U.S. PATENT DOCUMENTS

| 3,807,047 A | 4/1974 | Sherer et al. |
| 4,493,150 A | 1/1985 | Garcia et al. |
| 5,126,523 A | 6/1992 | Rinaldi |
| 5,165,160 A | 11/1992 | Poncelet |
| 2010/0071184 A1* | 3/2010 | Bronnimann et al. .......... 29/252 |

FOREIGN PATENT DOCUMENTS

JP     2002-1582     1/2002

OTHER PUBLICATIONS

U.S. Appl. No. 13/073,243, filed Mar. 28, 2011, Dagenais.
French Preliminary Search Report issued May 24, 2011, in French Patent Application No. 1003798 with English translation of category of cited documents.
U.S. Appl. No. 13/825,430, filed May 3, 2013, Dagenais.
U.S. Appl. No. 13/825,478, filed Jun. 12, 2013, Dagenais.

* cited by examiner

*Primary Examiner* — Lee D Wilson
*Assistant Examiner* — Nirvana Deonauth
(74) *Attorney, Agent, or Firm* — Oblon, Spivak, McClelland, Maier & Neustadt, L.L.P.

(57) ABSTRACT

Clamp for mechanical parts such as tubes or pipes, comprising a flange (5) with parts (13A, 13B, 13C) connected to one another so as to be pivotable as far as a closed position in which they are continuous. A locking device may be actuated when the flange is closed. The clamp further comprises supports (55; 57) by which rails (49) are connected to the parts with limited freedom of relative movement. The adjacent end faces of the rails have mating surfaces forming a connection by positive locking, which is active in the vicinity of the closed position. Each connection guides the end faces relative to one another into a working position in which the rails (49) form a guide path for tools, and helps to maintain this position when the clamping device is actuated.

12 Claims, 10 Drawing Sheets

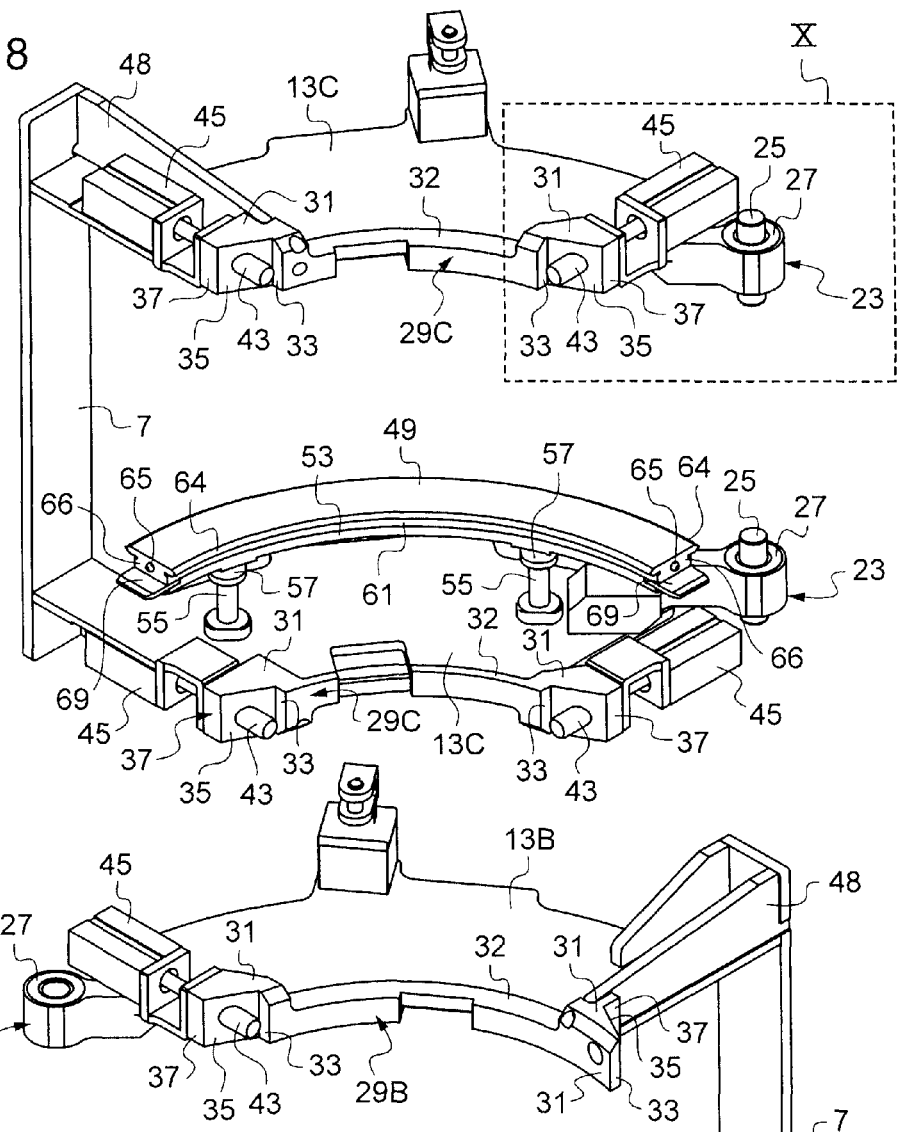
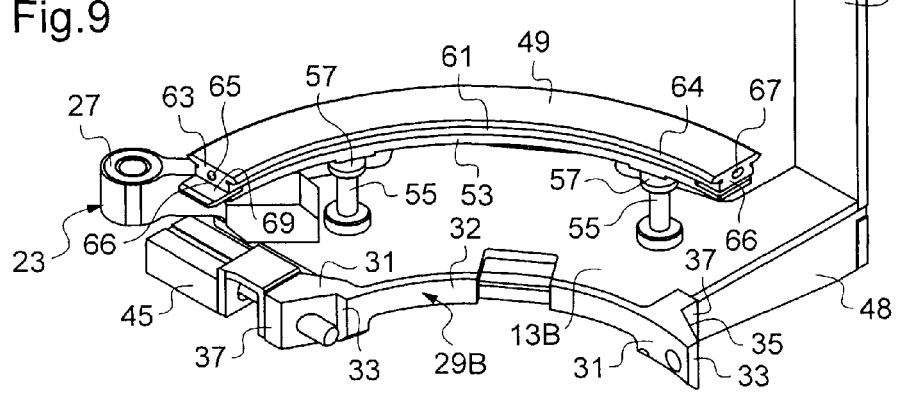

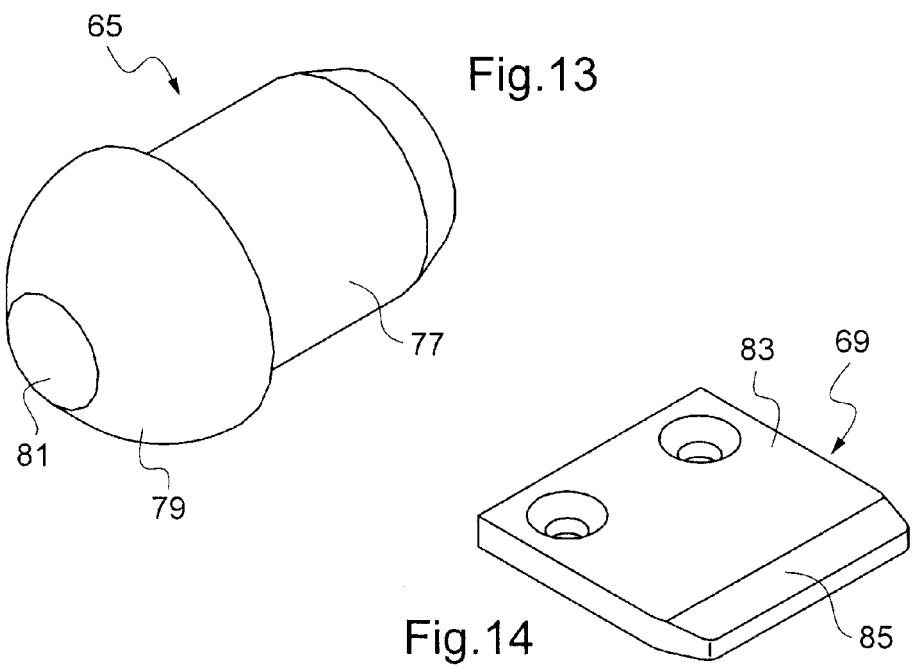
Fig.13
Fig.14
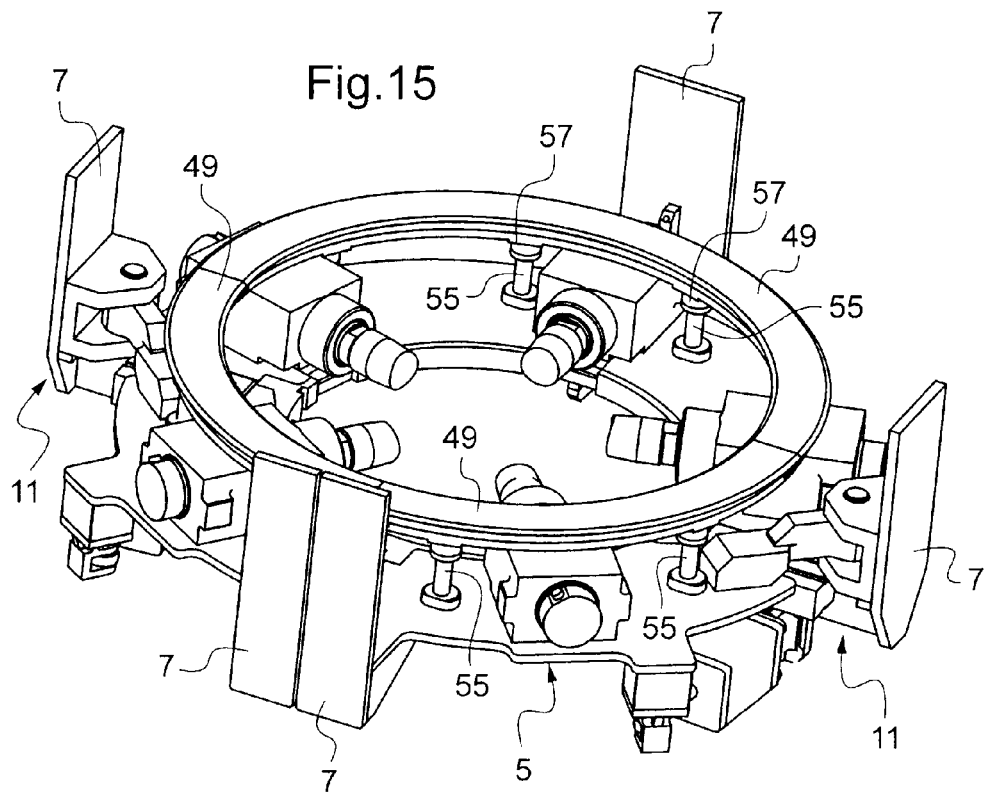
Fig.15

CLAMP COMPRISING A MULTI-PART GUIDE PATH

The invention relates to a device for assisting with the working of mechanical parts.

Although the invention falls within the scope of the working of mechanical parts in general, such as for example valve bodies, profiled sections, rails and the like, the subject of particular interest here is the working of tubes, notably pipes for use in the oil & gas industry (drilling, exploitation or transportation), purely for illustrative purposes.

In fact, it will readily be understood that certain difficulties encountered when working petroleum-carrying tubes may arise, in identical form or in a slightly different guise, in the working of tubes for use in other fields, on the one hand, and in the working of mechanical parts of any kind, on the other hand. This is the case in particular whenever these difficulties are linked, directly or indirectly, to a part of substantial bulk and/or mass, making it awkward to move the part that is to be worked.

The term "work" is to be understood here in a very broad sense as covering any operation carried out for industrial purposes on a mechanical part, whether or not it results in a change of shape, appearance, surface finish nature, function or connection with other mechanical parts. For example, a measuring operation and more generally any metrological operation is thus deemed to be work carried out on the mechanical part.

Other work that may be carried out on mechanical parts includes, as a non-restrictive example, the welding together of parts, the grinding and/or cutting out of a part, taking radiographic images, or any testing operation, particularly non-destructive.

For certain work it is sometimes more advantageous to attach the tools to the tube or to the mechanical part rather than to a work station, for example. This applies in particular to work that requires defining a frame with reference to the tube or the mechanical part. In the case of tubes, the welding of the ends of two tubes to one another, the measurement and/or correction of the circularity of a tube or cutting a tube into lengths may be mentioned by way of example.

In this case, a flange is provided which supports the tools and is attached around the tube or the mechanical part.

To ease its installation on the tube or part, the flange may be made in two or more parts which are joined together with the possibility of relative movement in a common plane from an open position of the flange in which the parts are apart from each other, to a closed position of the flange in which these parts are continuous around the tube or the part that is to be worked. A clamping device may be actuated, in the closed position of the flange, to bring the parts in question into abutment with, or close from, each other and ensure that this relative position of the parts is maintained in spite of the forces that may be generated by the tubes, particularly by their displacement.

Most of the work to be carried out on tubes and on mechanical parts in general requires precise and controlled movement of the tools relative to the tube or mechanical part. In the case of parts shaped as bodies of revolution, such as tubes, for example, numerous types of work require the tool or tools to be moved around the periphery of the part.

As it is not very practical to rotate heavy and/or bulky tubes or mechanical parts, it is preferable to arrange for the tools to be moved relative to the flange, which is attached to the tube or part with limited movement possibilities.

As existing solutions have proved only partially satisfactory, the Applicant has set out to improve the situation.

The proposed apparatus comprises a flange having at least two parts joined together with the ability to move relative to one another in a common plane, up to a closed position of the flange in which the parts are joined together, a locking device that can be actuated in the closed position of the flange to bring the said parts into mutual abutment, at least two rails, and is notable in that it further comprises a set of supports by means of which each rail is connected to at least one respective part of the flange with limited relative movement possibilities, in that the adjacent end faces of two rails have mating surfaces forming a connection by positive locking, this connection being active in the vicinity of the closed position, and in that each connection is arranged so as to guide the adjacent end faces relative to one another in a movement relative to said parts, to a working position in which the rails form a guide path for one or more tools, and in order to help keep these rails in mutual abutment, in this working position, when the locking device is actuated.

In the proposed apparatus, the rails are positioned relative to one another so as to create a path capable of supporting and guiding one or more tools or tool holders, independently of the positioning of the parts forming the flange and supporting these rails.

In other words, the positioning of the rails is separate from the positioning of the parts that form the flange. The parts forming the flange may be manufactured or machined with fairly large tolerances in their dimensions. In practice, only the rails and in particular their end faces connected by positive locking need to be precision manufactured or machined. It will be understood that the manufacturing costs of the apparatus are significantly reduced.

Moreover, when considerable forces are applied to the flange, for example in reaction to stress on the tube at a location remote from the flange, or to the forces generated by working (correcting the circularity of the tube in particular), these forces are not transmitted to the guide path, owing to the fact that the rails are mounted on resilient supports. This means that the design measures taken to improve the strength of the apparatus can be limited to the flange.

Furthermore, supposing that the forces in question cause deformation of the flange, this deformation does not affect either the positioning of the guide path relative to the flange or its shape. As a result, an integral guide path is maintained, irrespective of the stress conditions of the apparatus.

Optional features of the proposed apparatus which may be intended to complement, add to or replace the original features are described below:

- The mating surfaces comprise two complementary surfaces in mutual abutment in the working position.
- Each rail has one or more guide surfaces and the connection comprises an arrangement adapted to ensure continuity of these guide surfaces in the working position.
- The arrangement comprises at least one tongue projecting from the end face of a rail and a groove provided in the adjacent end face of a neighbouring rail, the tongue and the groove both being of the appropriate dimensions to fit into one another close to the position of closure of the flange.
- The tongue has a portion whose cross-section becomes progressively narrower towards its free end.
- The arrangement comprises at least one stud projecting from the end face of a rail and at least one recess formed in the adjacent end face of a neighbouring rail, the stud and the recess both being of the appropriate dimensions to fit into one another close to the closed position of the flange.
- The stud is at least partly hemispherical in configuration.

The apparatus may further comprise a set of resilient parts intercalated between the supports and their respective rails, in which the resilient parts are deformed on actuation of the locking device and are arranged so that this deformation generates a contact pressure between the end surfaces of the rails at a predefined minimum level.

The resilient parts are arranged so that the displacement of the rails relative to the said parts of the flange takes place at least in the vicinity of the position of closure with deformation of at least some of said resilient parts.

The resilient parts are arranged so as to work with shear forces when the locking device is actuated.

At least some of the resilient parts are in the form of a cylinder made of resilient material, and each cylinder is attached to one of the supports, on the one hand, and to a rail and/or a part of said flange, on the other hand.

The flange is in the form of a flat crown.

The guide path is of annular configuration.

Further features and advantages of the invention will become apparent from a study of the description that follows, and of the accompanying drawings, wherein:

FIG. 8 shows a second frame element for the clamp in FIGS. 2 to 6, viewed in isometric perspective;

FIG. 9 shows a third frame element for the clamp in FIGS. 2 to 6, viewed in isometric perspective;

FIG. 13 shows, on its own, a centering stud, viewed in isometric perspective;

FIG. 14 shows, on its own, an alignment tongue, viewed in isometric perspective;

FIG. 15 shows an alternative embodiment of an external clamp according to the invention.

The attached drawings comprise elements of a specific nature and as such may serve not only to complement the invention but also to help to define it, as necessary.

Figure 1:
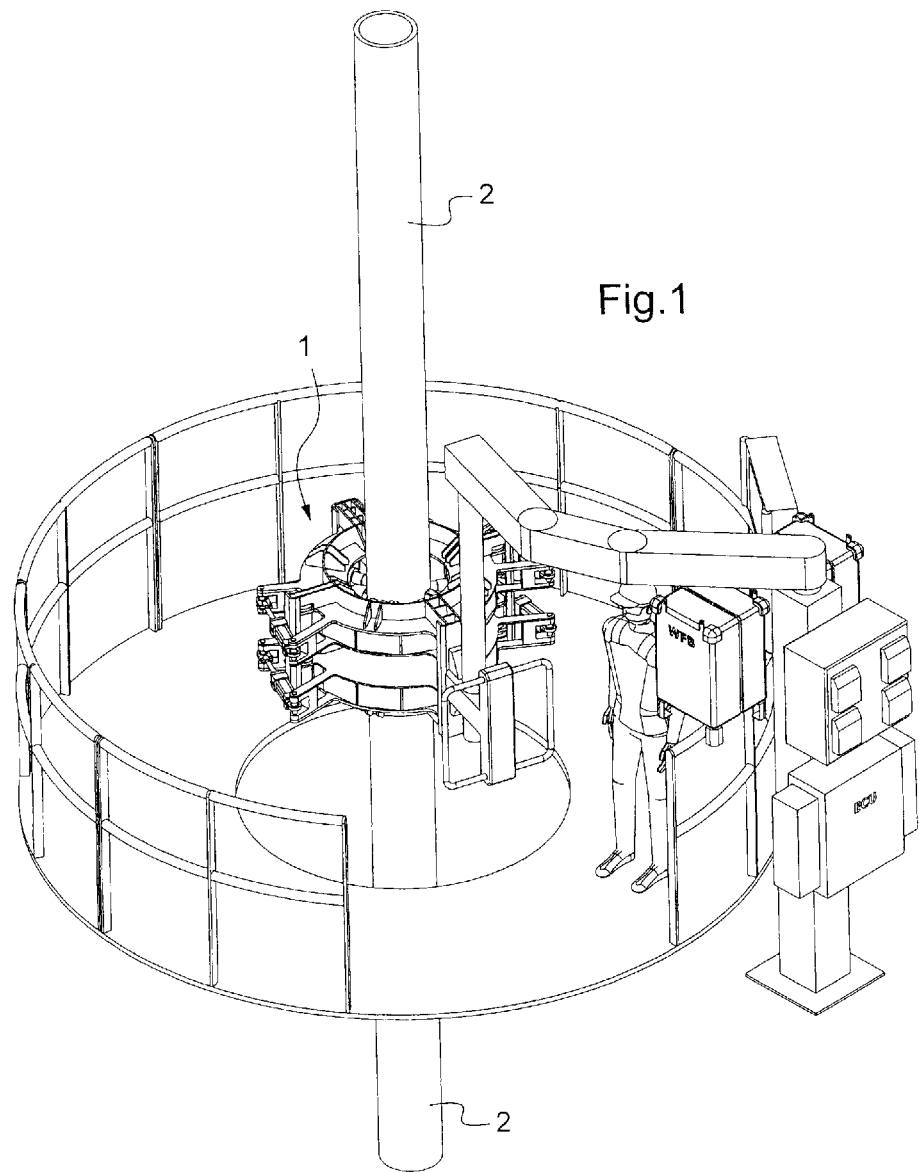
FIG. 1 shows an external clamp in a working situation, viewed in isometric perspective.
Figure 2:
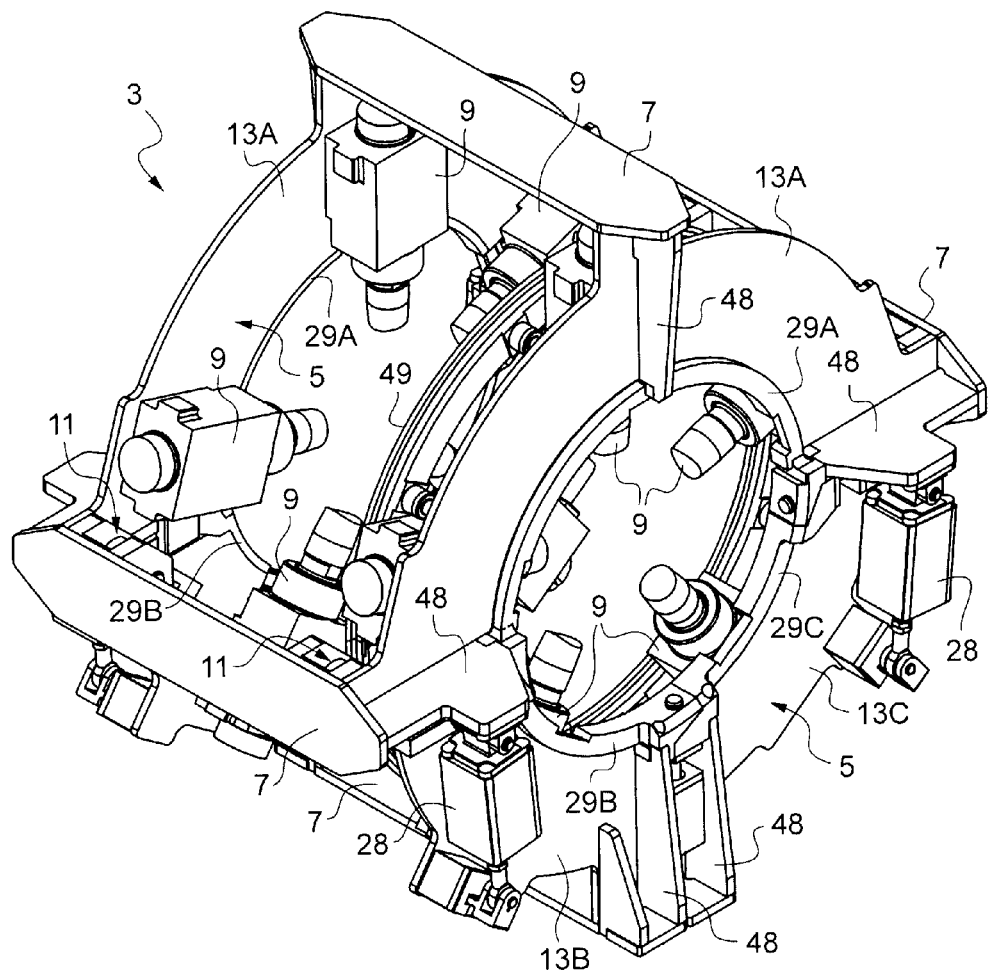
FIG. 2 shows an external clamp according to the invention, in a closed state, viewed in isometric perspective.
Figure 3:
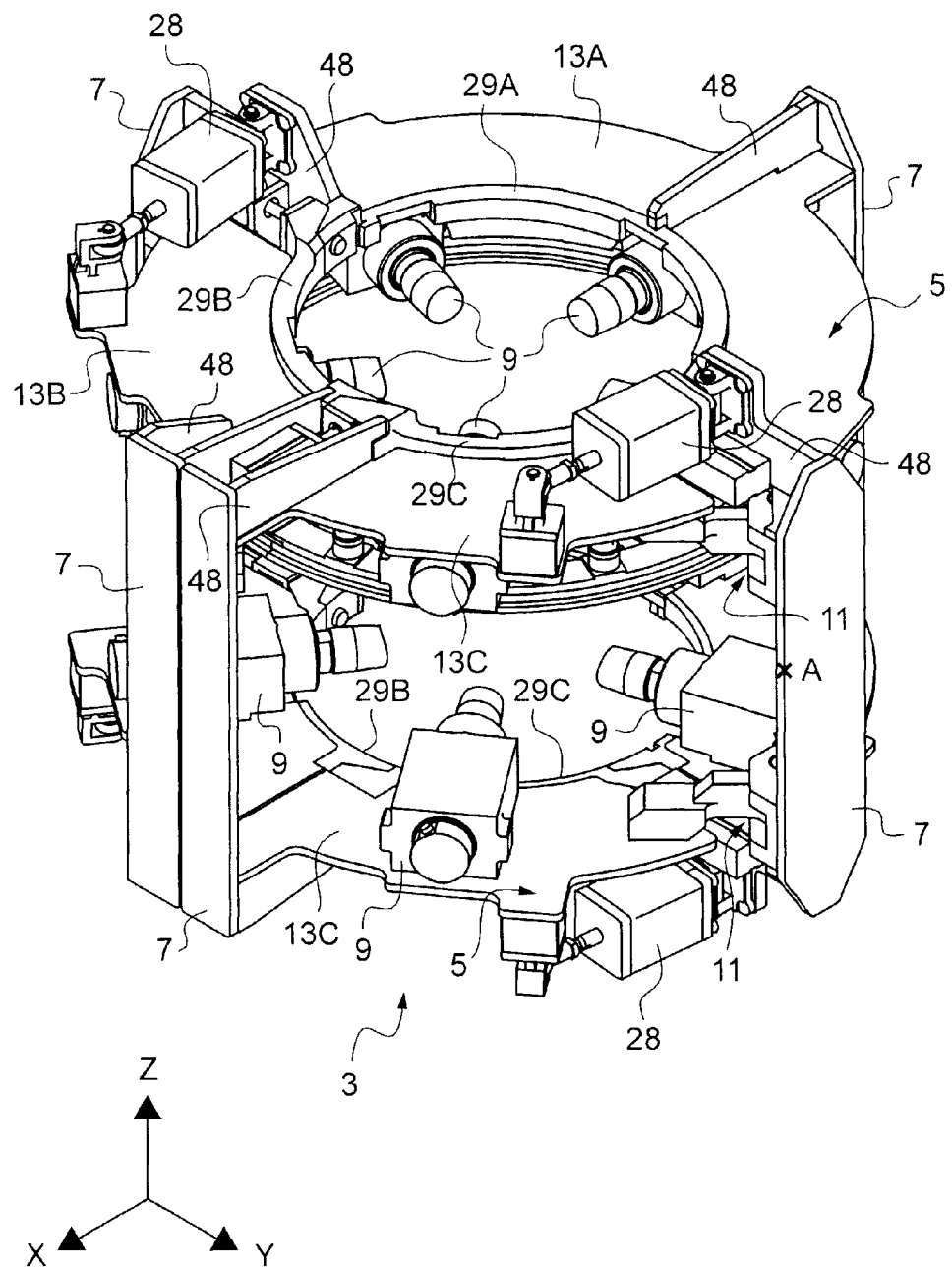
FIG. 3 shows the clamp from FIG. 2, viewed in isometric perspective, from a different angle.

FIG. 1 shows a welding clamp of a known type 1, mounted externally straddling respective end portions of two tubes 2, or pipes, intended to be welded together.

The clamp 1 supports the tooling needed to produce a weld bead between the ends of the tubes 3, i.e. a set of welding torches and a plurality of supplementary tools which, when used in conjunction with one another, make it possible to carry out welding operations over the entire length of a pipeline.

Reference will now be made to FIGS. 2 to 6 to describe a clamp 3 capable of operating in the manner of the known welding clamp 1.

As shown, the clamp 3 is particularly well suited to welding operations that are to be carried out on tubes with a diameter of between 4 inches and 24 inches, or even 64 or 100 inches. Consequently, the clamp 1 is adapted to fit the majority of the tubes used in the oil & gas industry, for extraction, drilling or even supplying.

However, the clamp 3 is by no means limited to this range of diameters, or to petroleum tubes.

On the other hand, the clamp 3 is not intended solely for welding operations and may not only include supplementary tooling such as measuring sensors, for example, but may also not be equipped with welding torches, at least for certain applications.

However, in every case, the clamp 3 supports tools intended for working on one or more tubes and is arranged so as to engage on the outer wall of these tubes.

The clamp 3 comprises a pair of flanges 5 each of which has the appearance of a flat crown and which are held fixedly opposite each other by crosspieces 7 to form a frame.

Each flange 5 supports a clamping/positioning system intended for an end portion of a respective tube, the said system comprises a plurality of clamping actuators 9 fixed to one side of the flange 5 so that their heads extend radially, in a plane parallel to a main plane of the flange 5, and in the central space thereof.

Each flange 5 may also support movement sensors (not shown) which make it possible to monitor the respective movements of the clamping actuators 9 in synchronised manner.

Each flange 5 may also support a guide system intended for an end portion of a respective tube 2 comprising a plurality of bearing supports (not shown), such as ball guides, fixed in a position such that they extend radially towards the centre of the flange 5, in a plane parallel to the main plane of the flange 5.

Thus equipped, each flange 5 makes it possible to move the central axis of its respective tube 2, up to a predefined position, or to displace this tube 3 in its longitudinal direction. The clamp 3 allows for mutual alignment of the tubes 2 on which it is installed, either along their outer diameter or along their inner diameter.

In other words, as described, the clamp 3 is adapted to be attached to end portions of tubes 2, to align these ends and to move them close to one another. The clamp 3 is able to support torches for welding these ends to one another.

Each flange 5 comprises a set of plates each extending over an angular sector of a crown, and connected to one another with the ability to pivot relative to one another, in a common plane, from an open position of the flange 5 in which the plates are spaced from one another, to a closed position of the flange 5 in which the plates 13 are joined together to form a crown.

In the embodiment shown, each flange 5 comprises a first plate 13A which extends over an angular sector of about 180°, a second plate 13B and a third plate 13C both of which extend over an angular sector of about 90°. The second plate 13B and the third plate 13C are each attached to a respective end of the first plate 13A via a hinge joint 11 the swivel axis of which is substantially perpendicular to the main plane of this plate.

Figure 7:
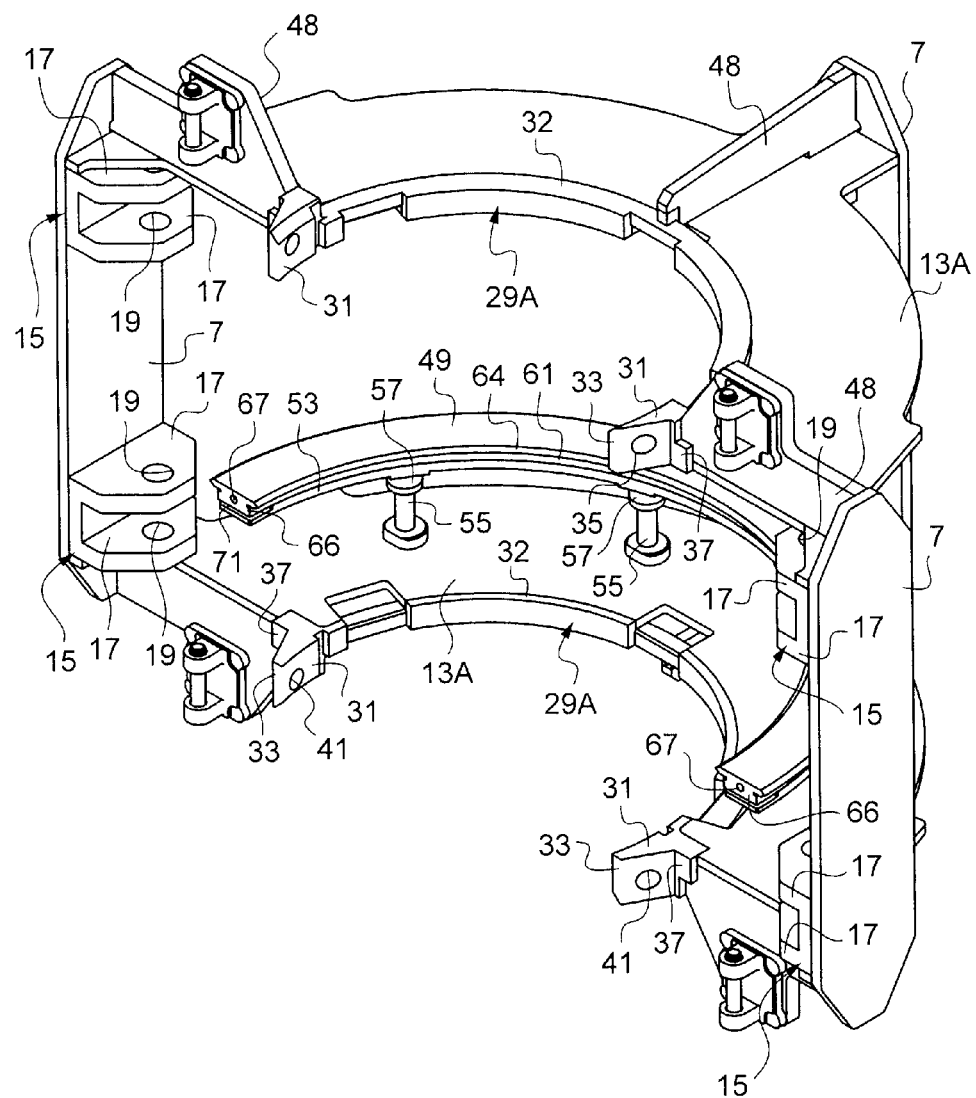
FIG. 7 shows a first frame element for the clamp in FIGS. 2 to 6, viewed in isometric perspective.

Referring to FIG. 7, a first plate 13A of each flange 5 supports, at each of its ends, a female part 15 of the hinge joint 11, this part comprising two lugs 17 attached to this first plate 13A via a crosspiece 7. The lugs 17 project from the crosspiece 7 so that their respective main planes extend parallel to the main plane of the first plate 13a.

Each of the lugs 17 is drilled with an opening 19, the openings 19 of the same hinge joint 11 being mutually aligned, and extending substantially perpendicularly to the main plane of the first plate 13A.

Referring to FIGS. 8 and 9, the second plate 13B and the third plate 13C of each flange 5 each support, at one of their ends, a male part 23 of the hinge joint 11. This male part 23 comprises a journal 25 (not shown in FIG. 9) corresponding to the openings 19 in the female part 15 and supported by a rotary bearing 27, for example in the form of a bushing.

The clamp 3 may be in an open position (shown in FIG. 6) in which the frame elements, each formed by assembling mating plates of the two flanges 5 and the crosspieces 7 that connect them to one another, are spaced from one another, or a closed position (shown in FIGS. 2 to 5) in which these frame elements are combined to form a frame of cylindrical configuration with a circular base. The movement of the frame elements relative to one another takes place under the action of opening/closing actuators 28 fixed to each flange 5.

Each flange 5 supports a locking system, which can be actuated in the closed position of the flange, which holds the first 13A, second 13B and third 13C plates fixedly relative to one another. The locking systems of the flanges 5 may be controlled simultaneously or independently of one another, depending on the intended uses.

Each of the first 13A, second 13B and third 13C plates supports, on its circular inner edge, a respective reinforcing structure in the form of a generally profiled part which extends lengthwise along a portion of a circle corresponding to the angular sector of the plate to which it is attached, in this case by being bolted on.

In other words, each plate has a reinforcing structure in the general shape of a curved profile the curvature of which corresponds to the inner edge of this plate.

Thus, each first plate 13A (FIG. 7) supports a first reinforcing structure 29A, each second plate 13B (FIG. 9) supports a second reinforcing structure 29B, and each third plate 13C (FIG. 8) supports a third reinforcing structure 29C.

Figure 12:
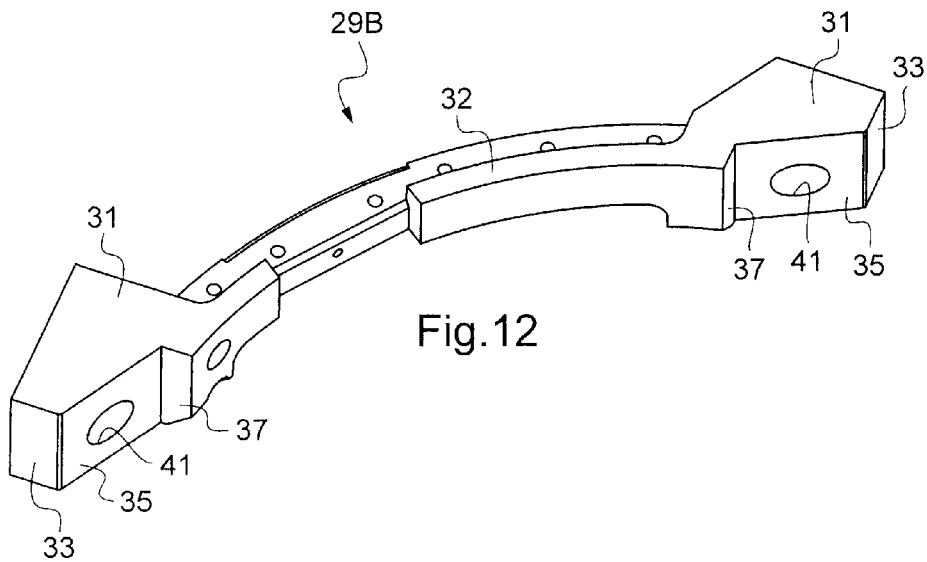
FIG. 12 shows, on its own, a reinforcement for the frame element in FIG. 8, viewed in isometric perspective.

Referring to FIGS. 7 to 9 and also to FIG. 12, each reinforcing structure has at each end a widened portion 31, the widened portions 31 of a structure being connected to one another by a profiled portion 32 of essentially square cross-section. Each widened portion 31 has surfaces mating with an adjacent widened portion 31 integral with a neighbouring plate, jointly forming a positively locking connection acting in the vicinity of the closed position of the flange 5.

Each widened portion 31 has a first end surface 33 and a second end surface 37, both of them planar, extending perpendicularly to the main plane of the plate that supports them, and approximately radially with respect to the latter.

This widened portion 31 also has a connecting surface 35, which is also planar, connecting the first end surface 33 to the second end surface 37.

By convention, the first end face 33 of a widened portion 31 is defined as the end surface located substantially on an extension of the profiled portion 32, while the second end face 37 is radially offset relative to this profiled portion 32.

Figure 10A:
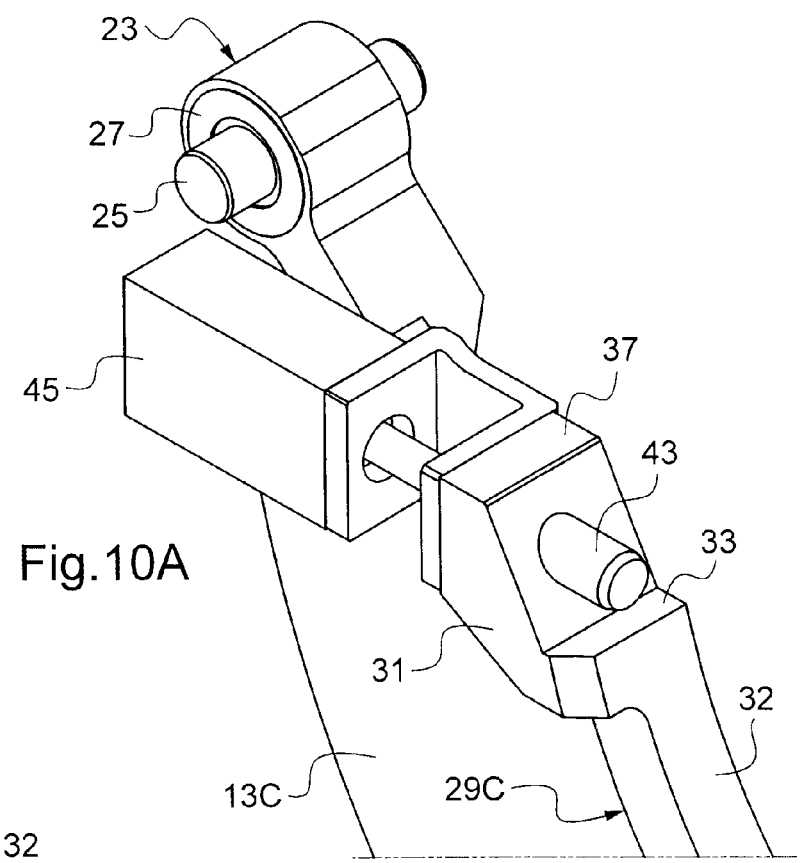
FIG. 10A shows a detail X from FIG. 8.
Figure 10B:
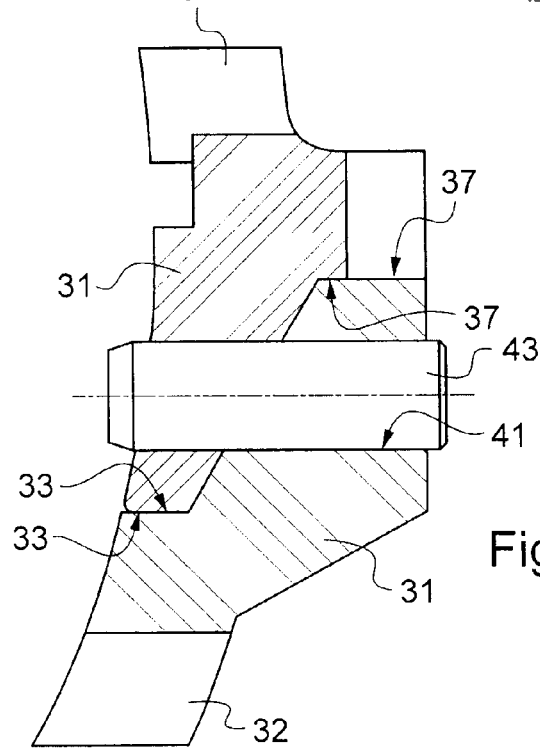
FIG. 10B shows a detailed part of FIG. 11, in a locked position of a clamp according to the invention, viewed in section.
Figure 11:
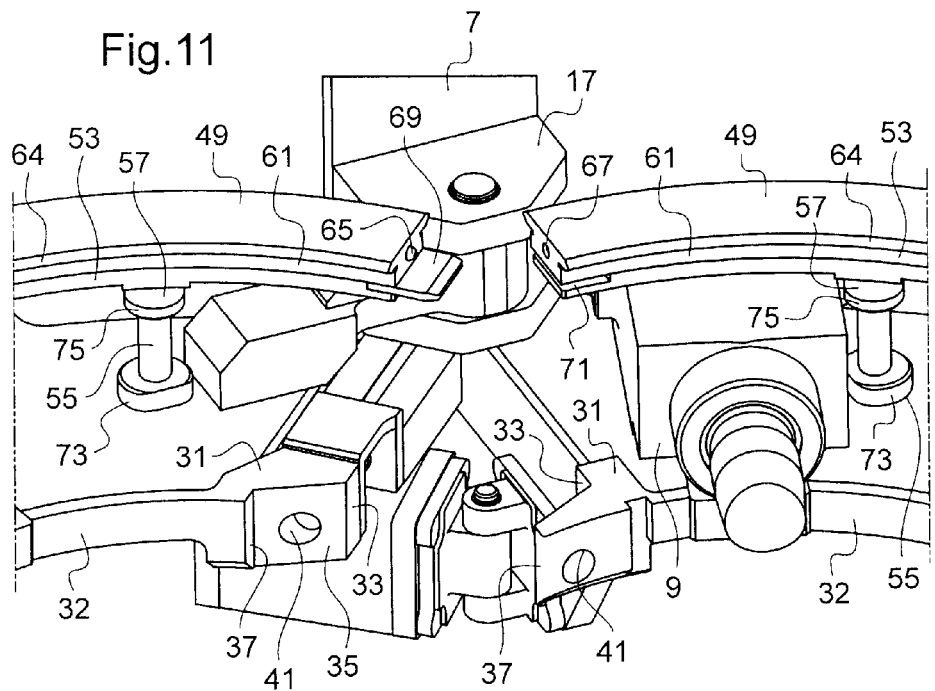
FIG. 11 shows a detail XI from FIG. 6.

Referring moreover to FIGS. 10A, 10B and 11, the widened portions 31 that cooperate in a same joint, i.e. which are arranged at adjacent ends of neighbouring plates of the same flange are arranged so as to engage mutually in the closed position of the flange, namely:

the first end surface 33 of a widened portion 31 is located opposite the first end surface 33 of the other widened portion 31;

the second end surface 37 of a widened portion 31 is located opposite the second end surface 37 of the other widened portion 31;

the connecting surfaces 35 of the two widened portions are located opposite one another.

Each widened portion 31 has a respective bore 41 which is drilled substantially radially and opens onto the connecting surface 35 roughly centrally.

When a flange 5 is open (see FIG. 10A for example), in each of the joints of this flange, one of the bores 41 accommodates a locking pin 43 of generally cylindrical shape with a circular base, fitting therein so that the pin 43 can pivot about its longitudinal axis and move in translation in a direction parallel to this axis. Each pin 43 is mounted on the rod of a respective locking actuator 45, the actuator being fixed to a corresponding plate. Preferably, a swivel connection is provided between the head of the locking actuator 45 and the pin 43 which it moves.

When a flange 5 is in the closed position in one of the joints of this flange, the widened portions 31 are mutually engaged, and the locking actuators 45 can be actuated to move their respective locking pins 43 until the latter partly projects into the bore 41 in an adjacent widened portion 41 (see FIG. 10B for example). When all the locking pins 43 are engaged in the bores 41 of a flange 5, this flange 5 is in a locked state.

The mating bores 41 may be slightly offset relative to one another: the distance separating the axis of one bore 41 from the second end surface 37 of the same widened portion 31 may slightly differ from the distance separating the axis of the mating bore 41 from the mating second end surface 37. Thus, the engagement of the pin 43 in the mating bore 41 gives rise to a mutual contact pressure between at least some of the first and second 37 mating surfaces.

Here, the offset is such that it is ensured, in the locked position of a flange 5, that the contact pressure in question operates between the second end surfaces 37 of all the connections of this flange. This makes it possible to achieve a continuity of material between the different reinforcing structures 29, thus improving the mechanical strength of the flange.

For example, the offset in question may be up to a few hundredths of a millimeter, for example 3. The first end surfaces 33 are machined with manufacturing tolerances that ensure that there is integral contact between the second end surfaces 37, i.e. the first end surfaces 33 do not come to bear on one another when the flange 5 that they form is locked.

As described, the widened portions 31, the locking pins 43 and the locking actuators 45 jointly fulfil a dual function, namely a function of clamping a flange 5, bringing the plates that form it to abut on one another via second end surfaces 37, and a function of locking this flange in the closed position.

On each occasion, a locking actuator 45, the pin 43 that it actuates and a pair of adjacent widened portions 41 form what may be referred to as a latch.

The second surfaces 37 form the mutual abutment surfaces of the first 13A, second 13B and third 13C plates of the same flange against one another.

In the closed/locked position, the reinforcing structures of a flange 5 extend jointly around a circle corresponding to the central edge of this flange 5, and thus form what might be referred to as a force take-up ring. Each of the first 29A, second 29B and third 29C structures is mechanically connected to one or more of the crosspieces 7 via reinforcing plates 48 which are fixed such that their main plane extends radially and perpendicularly to the corresponding plate. Each reinforcing plate 48 has a notched portion, at the end in this case, abutting substantially radially on a reinforcing structure. Reinforcing plates 48 are arranged at each of the adjacent ends of the second plate 13B and the third plate 13C. These reinforcing plates 48, in the vicinity of their notched portion, come to bear, with a large main surface, against a mating surface of a widened portion 31. Optionally, additional reinforcing plates (not shown) may be provided, having a curved part that engages around a profiled portion 32 of a reinforcing structure and bearing on the corresponding plate, thus further improving the strength of the flange 5, and thereby sparing the plates that make up this flange. These plates can then be made with a reduced thickness.

The connecting surfaces 35 extend perpendicularly to the main plane of the plate that supports the corresponding reinforcing structure, and are inclined in this case so as to be remote from the inner circular edge of the flange 5, to prevent any interference with the opening/closing of the corresponding flange 5.

Referring to FIGS. 2 to 7, and to FIG. 11, one of the flanges 5 supports a guide device for tools or for a tool-holder carriage. This guide device comprises a set of rails 49 each extending along a portion of a circle the angular amplitude of which corresponds to that of the plate which supports it.

Each rail 49 is supported on its respective plate by a support plate 53 extending in corresponding manner, against which it bears with a first large surface. Each support plate 53 is in turn supported by a large surface of the plate in question by columns 55 which are attached to a large surface opposite a large surface bearing on the first large surface of the corresponding rail 49.

Between each column 55 and the support plate 53 which it supports is interposed a resilient part, in this case constructed in the form of a cylinder 57 of resilient material, e.g. rubber. This permits limited movement of the rail according to six degrees of freedom. Each column 55 provided with its resilient cylinder forms a resilient support by means of which a rail 49 is at least partly connected to a plate of a flange 5.

The cylinder 57 is a "silentbloc" made by the Belgian company Paulstra (registered trade mark). Flexible elements of different kinds (springs, Belleville washers or the like) may be used, instead of or in addition to the cylinders 57.

Each rail 49 is made in the form of a profiled section having a body portion 61 attached to its first large surface, and a guide portion 63 adjacent to the body portion 61 and having a free large surface opposite the first large surface. Here, the guide portion 63 is wider than the body portion.

In the guide portion 63, the free large surface is bordered on both sides by a respective guide surface 64, each in the form of two surfaces arranged in a V, so as to form a guide section for tools or tool-holder carriages.

The adjacent ends of neighbouring rails 49 each have mating surfaces shaped to form a joint by positive locking acting in the vicinity of the closed position of the flange 5.

Each positively locking joint comprises a centering stud 65 which projects from a flat end surface 66 arranged substantially radially of a rail 49, and a centering opening 67 provided in a mating surface 66 of a neighbouring rail 49. The fit may be of the H7g6 type as defined in ISO standards.

Figure 4:
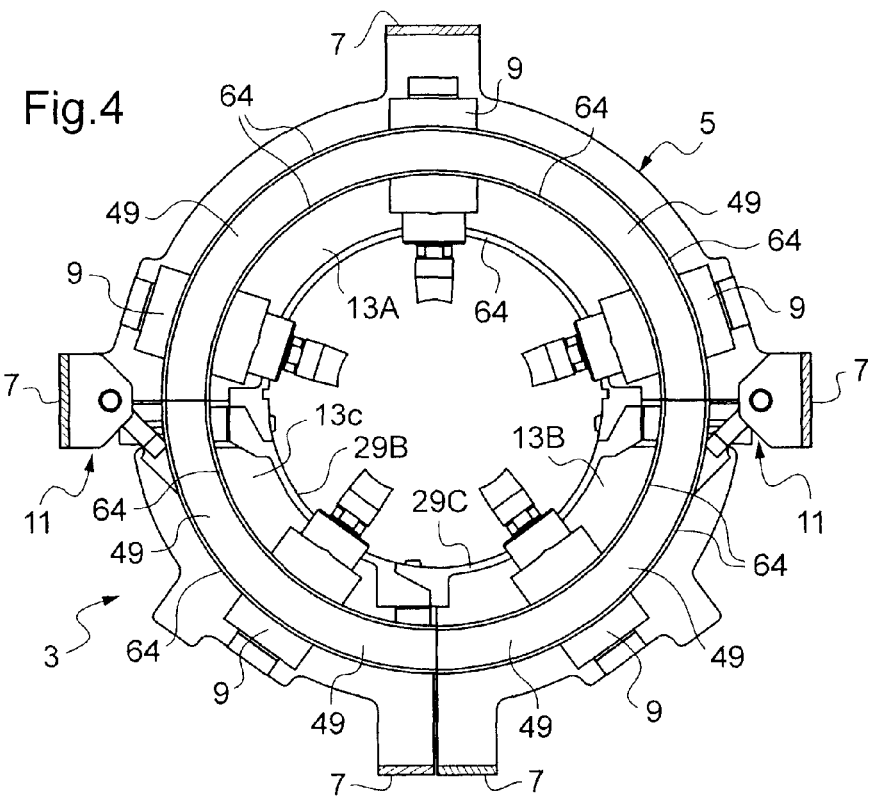
FIG. 4 shows the clamp of FIG. 3 viewed in section along a plane XY passing through a point A looking in the direction Z.
Figure 5:
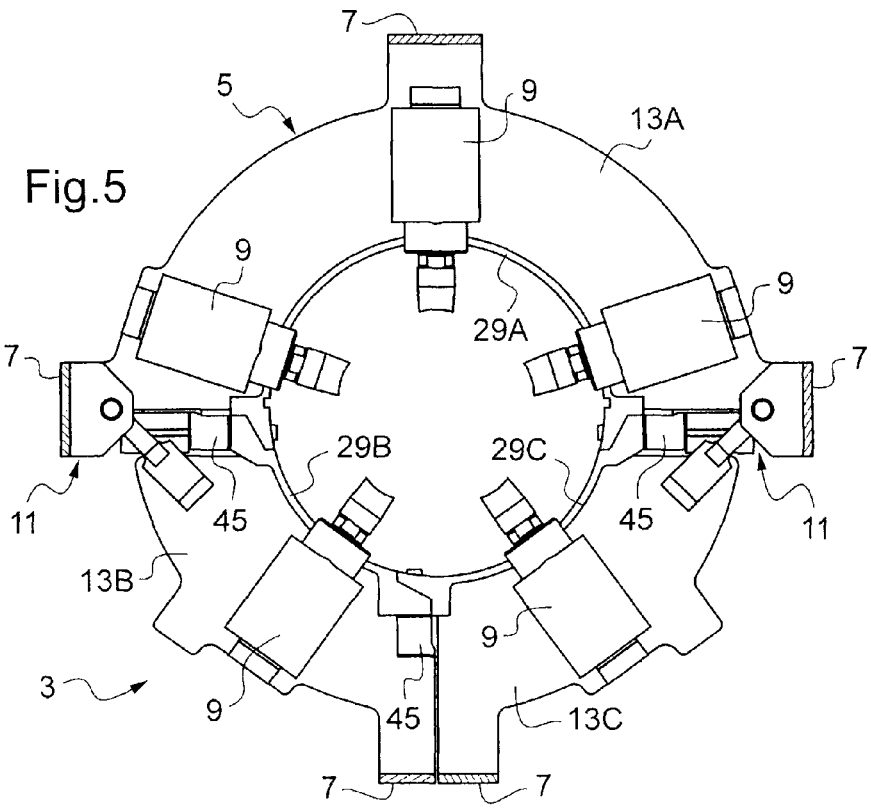
FIG. 5 is analogous to FIG. 4, looking in the opposite direction to direction Z.
Figure 6:
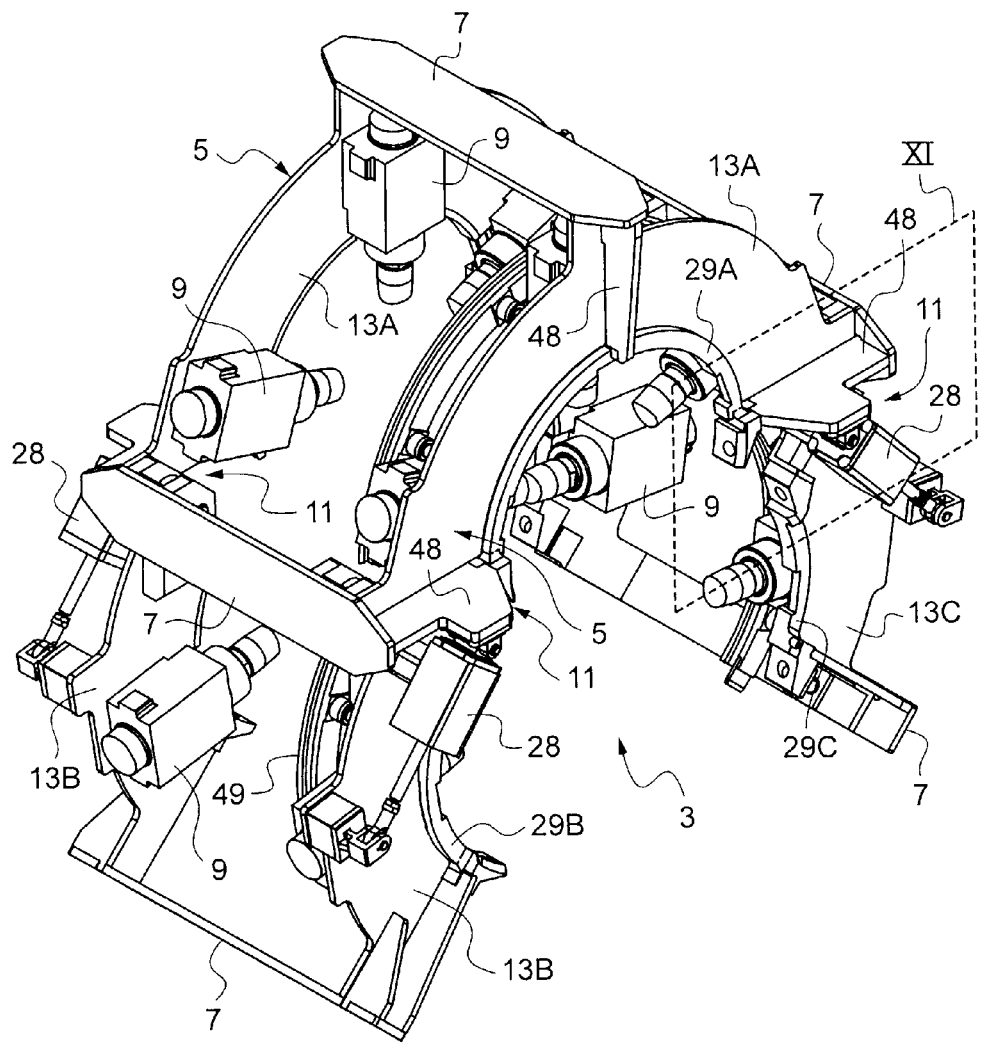
FIG. 6 is analogous to FIG. 2, with the clamp in an open state.

When a flange 5 is closed, the positively locking joint ensures that the adjacent end surfaces 66 of the neighbouring rails 49 are centred, relative to one another, guiding the rails 49 in question, in a movement relative to the plate that supports them, to the extent permitted by the deformation of the resilient cylinders 57, as far as a position in which they jointly form a guide path, which in this case is annular (see FIG. 4).

Each positively locking joint further comprises an alignment tongue 69 projecting from the flat end face 66 of a rail 49 and an alignment groove 71 provided in the mating surface of the adjacent face of a neighbouring rail 49. Here, each groove 71 is produced by providing a recess in the face of the support plate 53 in contact with the rail 49 that is supported, over a corresponding end portion thereof.

When the flange 5 is closed the positively locking joint ensures that the rails 49 are aligned relative to one another, more precisely that their guide edges 64 are aligned, by guiding the rails 49 in question in a movement relative to the plate that supports them, to the extent permitted by the deformation of the resilient cylinders.

The columns 55 project from the plates which support them, substantially perpendicularly to the main plane of these plates. The columns 55 are attached by a foot portion 73 to their respective plates and by a head portion 75 to a support plate 53 via a resilient cylinder 57. The feet 73 are distributed in a circle with a slightly smaller diameter than the circle in which the heads 75 are distributed.

Thus, when the clamping/locking device of the flange 5 is actuated, the resilient cylinders 57 operate with shear and generate a contact pressure of the flat end surfaces 66 against one another. Thus, a closure system for the guide path is obtained which is indirectly controlled by the locking system of the flange 5, with a forced abutment of the rails 49 against one another, which ensures that the guide path has the necessary integrity, even under conditions of loading of this path, particularly by the tools or tool holders.

The resilient cylinders are selected, dimensioned and positioned so as to obtain a contact pressure of a predefined magnitude, which largely depends on the mass of the tools and/or tool holders that are to be guided and, possibly, the forces that these tools exert on the guide path, under operating conditions.

When a centering stud 65 is engaged in the corresponding opening 67, the positioning of the end faces 66 relative to one another is ensured. Once the tongue 69 has engaged in the groove 71, the alignment of the guide surfaces 64 of the different rails 49 is ensured.

Referring to FIG. 13, a stud 65 is of revolutionary shape and comprises a cylindrical end portion 77 intended to be accommodated in a hole provided on the end face 66 of a rail 49, and an adjacent hemispherical portion 79, whose end opposite the cylindrical portion 77 has a flattened part 81.

Referring to FIG. 14, the tongue 69 is of generally flat and rectangular configuration, and comprises a portion of constant cross-section 83, intended to be trapped between the first large face of a rail 49 and the corresponding support plate 53 in a recess provided on the corresponding large face of this support plate 53 on an end portion, and a portion 85 the cross-section of which narrows progressively in a wedge shape towards its free end, in width and thickness.

The double V-shaped profile makes it possible to support welding torches, for example, but applies to other tools. When the locking system is closed, the rails 49 bear on one another with their end faces and thus provide a complete and precise circular guide for the tools and tool holders.

This ensures continuity of the guide surfaces 66 when the flange 5 is in the closed position, as well as the correct positioning of these guide surfaces, which are features essential to the production of a suitable guide path.

In fact, when there is even slight bending between two rails 49, the tools or tool holders jam when passing from one rail to the other. Analogously, offsetting of two rails would cause the tools or tool holders to jump when passing from one rail 49 to the other, resulting in welding defects in particular or, more generally, lack of precision in the working.

The columns 55 provided with their resilient cylinders 57 form resiliently deformable supports for the rail elements 49.

Supports of this kind enable the rails to be adjusted relative to one another, independently of the adjustment of the plates forming the flange 5 between them. This means that the plates in question can be machined with greater tolerances, preventing any deformations on the plates from resulting in deformation of the guide path.

This ensures the guide path to be kept in the closed position, apart from the shearing operation of the resilient cylinders 57, by the clamping effect obtained using the locking device described. It should be understood that this maintenance may be obtained whenever there is a clamping action of the plates against one another, whether by means of a specific device, including devices of a different embodiment from the clamping/locking device described, a device which also provides a different primary function, or in some other way. The choice of the clamping device will depend chiefly on the contact pressure needed between the rails 49. It should be understood, on the one hand, that the strength capabilities of the closure of the guide path depend to a large extent on the clamping force of the plates against one another, and on the other hand, the strength requirements of this closure may differ according to the particular applications envisaged, and in particular as a function of the mass of the tools or tool holders being supported.

For example, the locking actuators also tend to clamp the plates against one another. The opening/closing actuators too. The clamped state resulting from some and/or others of these actuators may lead to a sufficient strength of closure of the guide path, at least for certain applications. In this case, the locking/clamping device described, while advantageous in that it imparts good rigidity to the flanges 5 while keeping their mass fairly low, appears to be optional. In other cases, the clamping effect obtained with the device described may prove inadequate and require additional closing means, including means mounted directly between the rails 49, for example by means of toggles.

The reinforcing structures described are advantageous in that they allow a flange 5 to be made very rigid without increasing its mass. However, in applications in which the phenomena linked to the mass of the flanges 5 are of only limited importance, a similar degree of rigidity could be obtained by using thicker plates, for example.

Plates assembled by means of hinge joints are described, which allow the plates to pivot relative to one another. The invention is not limited to this type of joint but encompasses all joints that would enable a set of plates forming a flange to adopt a closed position and an open position regardless of the relative movement permitted by these joints.

The annular guide path described hereinbefore is especially suited to working parts shaped as bodies of revolution in particular. For working mechanical parts of a different kind, or for work that does not require the tools to perform a complete revolution around the mechanical part, guide paths that are not closed may be envisaged, of any desired shape.

The invention is not limited to the embodiments described hereinbefore, solely by way of example, but encompasses all the variants that may be envisaged by the skilled man, in particular:

- each rail 49 may extend over an angular sector that is different from that of the plate that supports it;
- the support plate 53 is optional; the rail 49 may be attached directly to the columns 55;
- resilient cylinders 57 may be provided at the feet of the columns 55, in addition to or instead of the resilient cylinders 57 arranged at the heads of these columns;
- on the principle of the flange 5 described, flanges 5 of all shapes and having any number of plates may be produced;
- as described, the clamp 3 is particularly well suited to the welding together of tubes to form a product of considerable length such as a pipeline, for example. The following process may be used:
    one of the flanges 5 is clamped to an end portion of the long product,
    a tube is brought close to the end portion of the long product, then the second flange 5 is clamped to the adjacent end portion of the tube,
    the holding actuators are actuated so as to align the tube and the long product,
    a welding bead is produced, by moving one or more tools.
- for other applications, the clamp 3 may comprise only one flange 5, as shown in the alternative embodiment illustrated in FIG. 15;
- the locking device may comprise only a single latch, irrespective of the number of plates that make up the flange that is to be locked;
- The rail 49 may have a square-shaped section, and/or be tubular, and/or have any other shape that permits guiding;
- resiliently deformable supports for the rails 49 may be produced in different forms, for example with springs, Belleville washers and the like, instead of or in addition to the resilient cylinders.

The invention claimed is:

1. A device for assisting with the working of mechanical parts, comprising:
    a flange having at least two parts joined together with the ability to move relative to one another in a common plane, up to a closed position of the flange in which the parts are joined together;
    a locking device that can be actuated in the closed position of the flange to bring said parts into mutual abutment;
    at least two rails;
    a set of resilient supports connecting each rail to at least one respective part of the flange with limited scope for relative movement;
    wherein adjacent end faces of the at least two rails have mating surfaces forming a connection by positive locking, said connection being active in the vicinity of the closed position;
    wherein each connection is arranged so as to guide the adjacent end faces relative to one another in a movement relative to said parts, to a working position in which the rails form a guide path for one or more tools, and in order to help keep these rails in mutual abutment, in said working position, when the locking device is actuated,
    wherein each rail has one or more guide surfaces and the connection comprises an arrangement adapted to ensure continuity of said guide surfaces in the working position, and
    wherein said arrangement comprises at least one tongue projecting from an end face of a rail and a groove provided in the adjacent end face of a neighboring rail, the tongue and the groove both being of the appropriate dimensions to fit into one another close to the position of closure of the flange.

2. A device according to claim 1, wherein said mating surfaces comprise two complementary surfaces coming into mutual abutment in the working position.

3. A device according to claim 1, wherein the tongue has a portion with a cross-section being progressively narrower towards a free end of said tongue.

4. A device according to claim 1, wherein the arrangement comprises at least one stud projecting from the end face of a rail and at least one recess formed in the adjacent end face of a neighboring rail, the stud and the recess both being of the appropriate dimensions to fit into one another close to the position of closure of the flange.

5. A device according to claim 4, wherein the stud is at least partly hemispherical in configuration.

6. A device according to claim 1, further comprising a set of resilient parts intercalated between the supports and their respective rails, in which the resilient parts are deformed on actuation of the locking device and are arranged so that upon deformation a contact pressure is generated between the end surfaces of the rails at a predefined minimum level.

7. A device according to claim 6, wherein the resilient parts are arranged so that a displacement of the rails relative to said parts of the flange takes place, at least in the vicinity of the closed position, with deformation of at least some of said resilient parts.

8. A device according to claim 6, wherein the resilient parts are arranged so that the resilient parts each work with shear forces when the locking device is actuated.

9. A device according to claim 6, wherein at least some of the resilient parts comprise a cylinder made of resilient material, and each cylinder is attached to one of the supports, and to a rail or a part of said flange.

10. A device according to claim 1, wherein the flange comprises a flat crown.

11. A device according to claim 1, wherein the guide path is of annular configuration.

12. A device according to claim 6, wherein at least some of the resilient parts comprise a cylinder made of resilient material, and each cylinder is attached to one of the supports, and to a rail and a part of said flange.

* * * * *